United States Patent [19]

Jaeger

[11] Patent Number: 4,905,745
[45] Date of Patent: Mar. 6, 1990

[54] WOODCUTTING GUIDE

[76] Inventor: Waldemar A. Jaeger, 234 Main St., Palmerston, Ontario, Canada, N0G 2P0

[21] Appl. No.: 343,887

[22] Filed: Apr. 25, 1989

[51] Int. Cl.$^4$ .............................................. B27C 5/00
[52] U.S. Cl. .................................. 144/134 R; 83/821; 33/197; 33/563; 144/144 R; 144/144.5 R; 144/134 D; 409/182
[58] Field of Search ................. 33/197, 563; 269/87.3; 83/821; 409/130, 182; 144/144.5, 137, 144 R, 134 R, 134 D, 136 C

[56] References Cited

U.S. PATENT DOCUMENTS

| | | | |
|---|---|---|---|
| 3,243,179 | 3/1966 | Wing | 144/144.5 |
| 3,450,001 | 6/1969 | Fortune | 144/144.5 |
| 3,540,130 | 11/1970 | French | 409/130 |
| 3,782,431 | 1/1974 | Cox | 144/144.5 |
| 4,095,632 | 6/1978 | Raulinaitis | 409/130 |
| 4,603,717 | 8/1986 | Thomas | 144/144.5 GT |

Primary Examiner—W. Donald Bray
Attorney, Agent, or Firm—Leon Gilden

[57] ABSTRACT

A woodcutting guide is set forth wherein an elongate guide surface maintains a cutting tool in alignment overlying a workpiece to be cut. The guide includes an elongate coextensive "T" slot with a first fixed arm directed orthogonally outwardly thereof, with a second movable arm spaced from the first arm positioned outwardly thereof wherein each arm terminates in a guide cylinder slidingly overlying a pipe clamp secured to the workpiece. A friction surface against the guide maintains adherence of a tool pressed thereagainst and enables the guide to be movably repositioned along the length of the pipe cylinder of the pipe clamp organization.

7 Claims, 3 Drawing Sheets

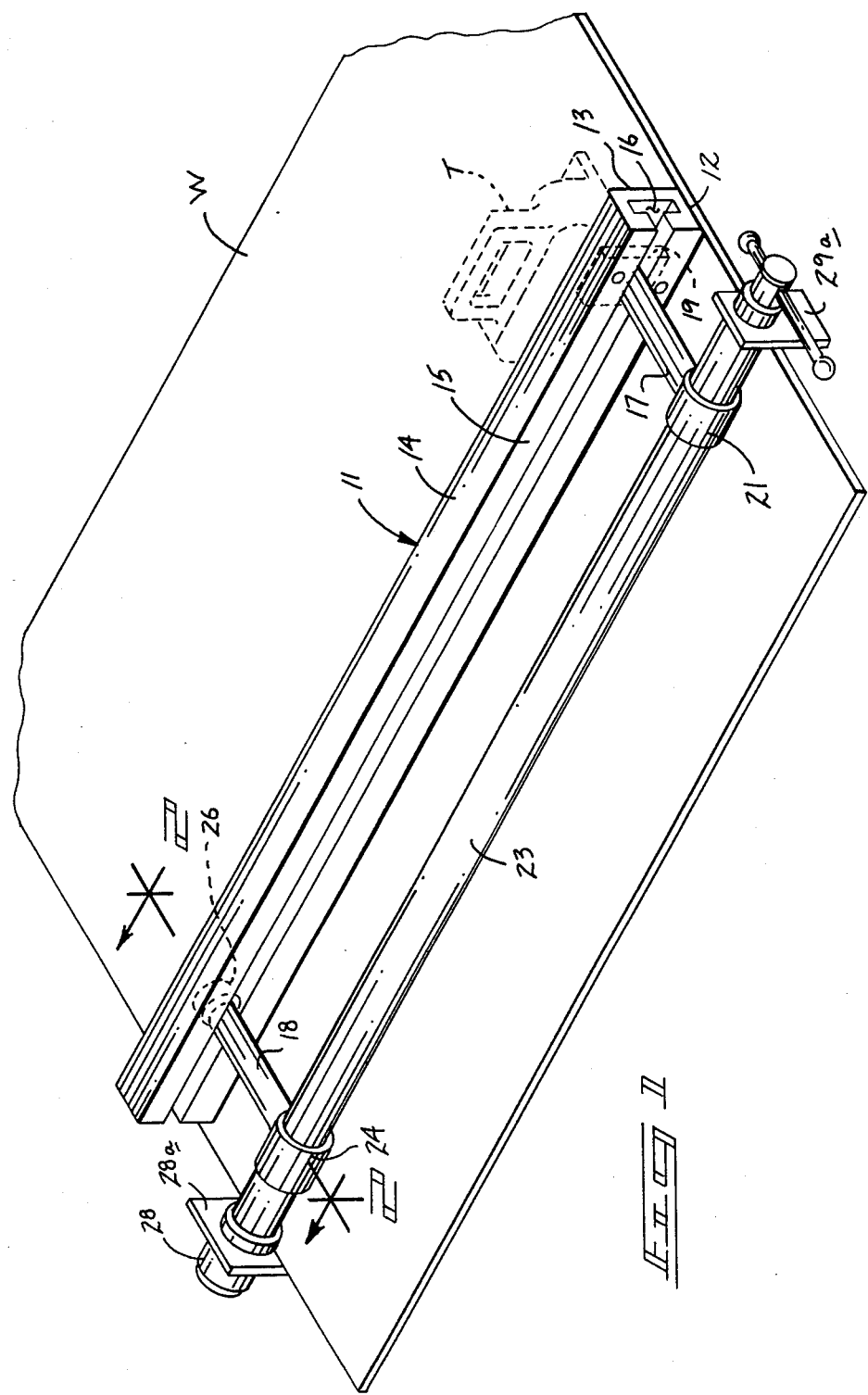

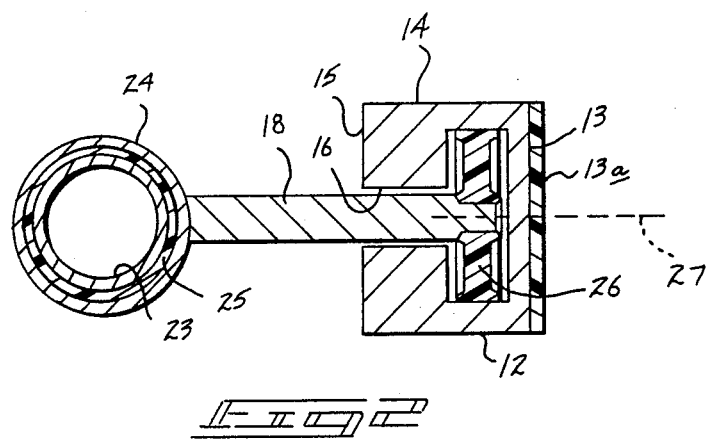
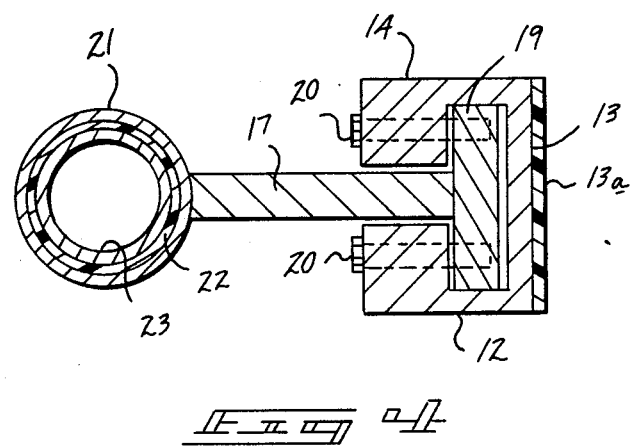

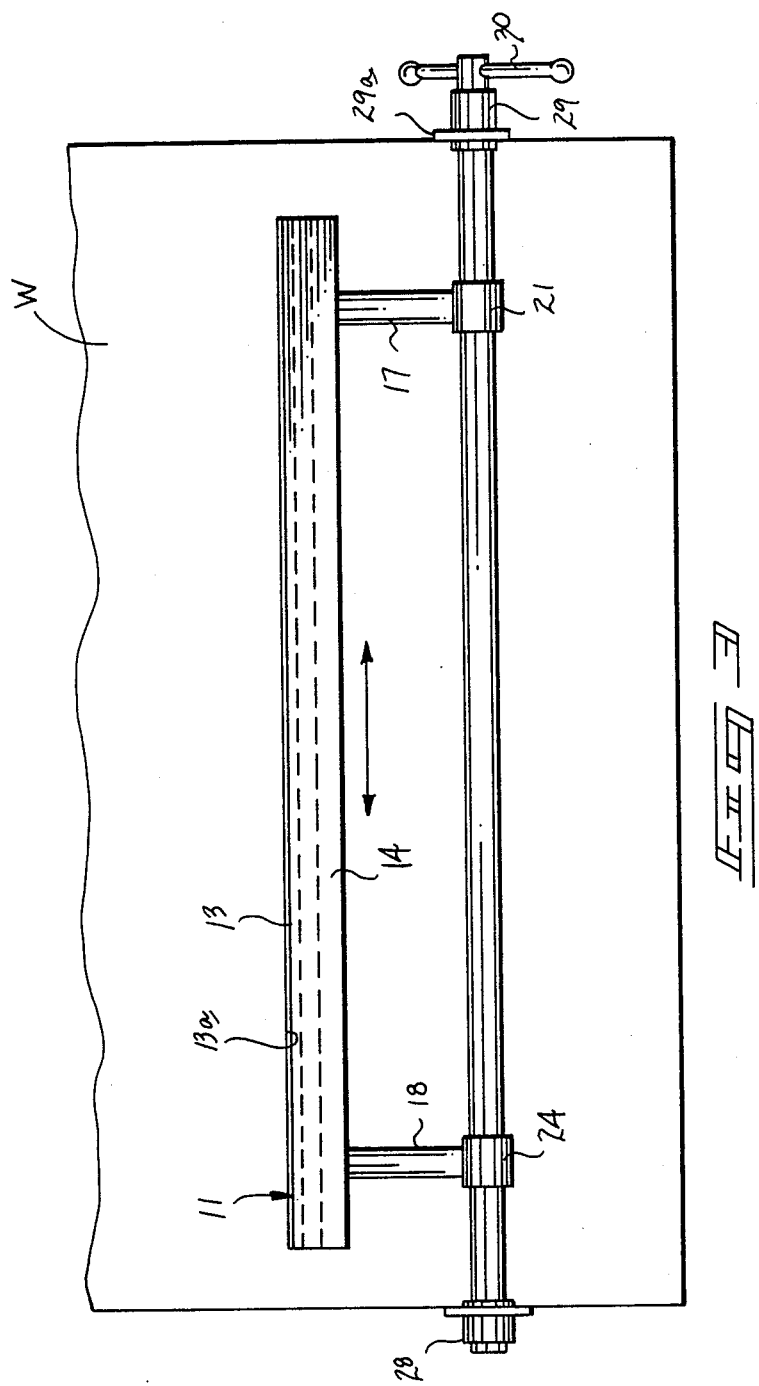

WOODCUTTING GUIDE

BACKGROUND OF THE INVENTION

1. Field of the Invention

The field of invention relates to saw guides, and more particularly pertains to a new and improved woodcutting guide wherein the same enables alignment of a woodcutting tool on a predetermined linear path.

2. Description of the Prior Art

The use of guides for various woodcutting instruments, such as routers, jigsaws, and circular saws, is provided in the prior art, but heretofore the prior art devices have been of relatively complex and elaborate organization limiting their ease of use and accordingly their repeat usage in a woodcutting operation. For example, U.S. Pat. No. 3,248,179 to Wing sets forth a router template wherein a perimeter series of clamps maintains a workpiece with a support table with an opening therethrough enabling access of a router directed downwardly thereof in engagement with the workpiece.

U.S. Pat. No. 8,450,001 to Fortune sets forth a router guide wherein a router overlying a slidably mounted table enables a cutting operation of an underlying workpiece supported within a framework.

U.S. Pat. No. 3,540,130 to French sets forth a routing template jig wherein opposed sides of the jig are movably mounted to secure a workpiece thereto to enable a router to be mounted over the workpiece to effect the cutting operation.

U.S. Pat. No. 3,782,431 to Cox utilizes a rectangular routing guide arrangement wherein a pair of transverse bolts and spaced guide bars locate a router therebetween for a cutting orientation to a workpiece.

U.S. Pat. No. 4,603,717 to Thomas sets forth a template for use by a dove-tail cutter to align the dove-tail cutter in an underlying workpiece.

As such, it may be appreciated that there is a continuing need for a new and improved woodcutting guide wherein the same addresses both the problems of ease of use and effectiveness in construction, and in this respect, the present invention substantially fulfills this need.

SUMMARY OF THE INVENTION

In view of the foregoing disadvantages inherent in the known types of woodcutting guides now present in the prior art the present invention provides a woodcutting guide wherein the same sets forth a guide including spaced guide bars to enable the woodcutting guide to be slidably mounted along a pipe clamp arrangement to guide a woodcutting tool linearly of an associated workpiece. As such, the general purpose of the present invention, which will be described subsequently in greater detail, is to provide a new and improved woodcutting guide which has all the advantages of the prior art woodcutting guides and none of the disadvantages.

To attain this, the woodcutting guide of the instant invention essentially comprises a guide bar defined as an elongate channel member including an interiorly coextensive "T" slot with an exterior friction face for mounting a tool abutment thereagainst with a plurality of support arms extending rearwardly and orthogonally relative to a rear face of the guide wherein a first arm is fixed relative to the guide and is slidingly mounted on a pipe cylinder of the pipe clamp with a second arm slidably mounted on the guide and slidably receives the pipe cylinder of the pipe clamp therewithin to enable the guide to be slidably repositioned along an underlying workpiece for effecting cutting of the underlying workpiece, as desired.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows ma be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important therefore that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved woodcutting guide which has all the advantages of the prior art woodcutting guides and none of the disadvantages.

It is another object of the present invention to provide a new and improved woodcutting guide which may be easily and efficiently manufactured and marketed.

It is a further object of the present invention to provide a new and improved woodcutting guide which is of a durable and reliable construction.

An even further object of the present invention is to provide a new and improved woodcutting guide which is susceptible of a low cost of manufacture with regard to both materials and labor, and which accordingly is then susceptible of low prices of sale to the consuming public, thereby making such woodcutting guide economically available to the buying public.

Still yet another object of the present invention is to provide a new and improved woodcutting guide which provides in the apparatuses and methods of the prior art some of the advantages thereof, while simultaneously overcoming some of the disadvantages normally associated therewith.

Still another object of the present invention is to provide a new and improved woodcutting guide wherein the same provides for a reciprocating guide slidably mounted overlying a workpiece quickly and readily securable to the workpiece utilized in a spaced parallel pipe clamp arrangement.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view taken along the lines 2—2 of FIG. 1 in the direction indicated by the arrows.

FIG. 3 is a top orthographic view of the instant invention.

FIG. 4 is an orthographic cross-sectional view of the fixed support arm arrangement of the instant invention.

DESCRIPTION OF THE PREFERRED EMBODIMENT

With reference now to the drawings, and in particular to FIGS. 1 to 4 thereof, a new and improved woodcutting guide embodying the principles and concepts of the present invention and generally designated by the reference numeral 10 will be described.

More specifically, the woodcutting guide apparatus 10 essentially comprises an elongate guide bar 11 of a rectangular cross-sectional configuration including a bottom planar wall 12, a forward wall 13, a top wall 14, and a rear wall 15. The forward wall 13 includes a tool guide polymeric frictional laminate 13a secured thereon to frictionally assist in maintaining positioning of a tool "T" and abutment thereagainst in its directed traverse over an underlying workpiece "W". The tool "T" may comprise a router, a jig saw, a circular saw, and the like.

Extending interiorly of the rear wall 15 is a "T" slot 16 coextensive with the guide bar 11 and arranged parallel to the top, bottom, and forward walls of the guide bar. Extending orthogonally outwardly of the rear wall 15 and of the "T" slot 16 is a first fixed support arm 17 of a length of approximately two to four inches. The first support arm 17 includes a "T" shaped web 19 integrally and orthogonally mounted to a forward end of the first arm 17 and of a complementary cross-sectional configuration to the "T" slot 16 with a plurality of connector bolts 20 directed through the rear wall 15 on diametrically opposed sides of the first arm 17 to maintain the arm 17 in a fixed orientation relative to the guide 11. The first arm 17 has integrally secured at its opposed end a first guide cylinder 21 orthogonally arranged relative to an access defined by the first arm 17 with a first guide bushing 22 to slidably receive a pipe cylinder 28 therethrough. The pipe cylinder 23 is arranged parallel to the guide bar 11 and is maintained in its parallel spacing with a second movably mounted arm 18 extending orthogonally outwardly of the "T" slot 16 and of an equal length to that of the first arm 17. The second arm 18 includes a second guide cylinder 24 axially aligned with the first guide cylinder 21 and including a second guide bushing 25 therewithin to slidably receive the pipe cylinder 25 therethrough. The second movably mounted arm is includes a rotatably mounted guide bushing 26 of a height substantially equal to the height of the "T" slot 16 and is rotatably mounted to the second arm 18 orthogonally to the second arm axis 27. The pipe cylinder 23 has secured proximate each terminal end a clamp comprising a first pipe clamp 28 and a second pipe clamp 29 each including a respective first jaw 28a and a second movable jaw 29a to secure the workpiece "W", wherein the second jaw 29a is adjustably mounted utilizing an adjustment screw 31 to clamp the workpiece "W".

In use, the tool "T" is positioned against the friction guide laminate 13a subsequent to aligning the guide bar 11 adjacent a prescribed linear cutting path. The tool "T" and guide bar 12 are merely reciprocated along the pipe cylinder 23 to effect a cutting of the underlying workpiece "W".

As to the manner of usage and operation of the instant invention, the same should be apparent from the above disclosure and accordingly, no further discussion relative to the manner of usage and operation of the instant invention shall be provided.

With respect to the above description then it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, suitable modifications and equivalents may be resorted to, falling within the scope of the invention.

What is claimed as being new and desired to be protected by Letters Patent of the United States is as follows:

1. A woodcutting guide to direct a woodcutting tool in a cutting operation over an underlying workpiece, said guide comprising, an elongate guide of a generally rectangular cross-sectional configuration including an elongate T-slot and defined by a forward wall spaced from a rear wall including a continuous slot extending into the T-slot, a bottom workpiece engaging wall spaced underlying a top wall, and a first arm fixedly mounted to and extending outwardly of the rear wall from the T-slot and aligned with a second arm wherein the second arm is movably mounted with the T-slot relative to the first arm along the rear wall of the guide and extends outwardly of the continuous slot of the rear wall, and the first arm including a first guide member fixedly mounted at a forward terminal end of the first arm remote from the rear wall, and the second arm including a second guide member fixedly mounted at a forward terminal end of the second arm remote from the rear wall, and each guide member slidingly receiving an elongate clamp cylinder, and said clamp cylinder mounting a first clamp and a second clamp spaced from one another to secure the underlying workpiece.

2. A woodcutting guide as set forth in claim 1 wherein the guide is aligned parallel to the clamp cylinder.

3. A woodcutting guide as set forth in claim 2 wherein the first guide member and the second guide member each includes a slide bushing coaxially aligned with the guide member and each bushing aligned coaxially relative to one another to receive the clamp cylinder.

4. A wood cutting guide as set forth in claim 3 wherein the elongate "T" slot within the guide bar is coextensive thereof and extends inwardly of the rear wall and wherein the "T" slot receives an interior end of the first arm, and the interior end of the first arm includes a flange fixedly mounted to the first arm and aligned within the "T" slot and wherein the flange is of a complementary cross-sectional configuration to that defined by the "T" slot, and further including a plurality of fasteners directed through the rear wall and fixedly securing the flange to the guide member.

5. A woodcutting guide as set forth in claim 4 wherein the first arm and the second arm are parallel to one another and wherein the second arm includes a rotating bushing rotatably mounted interiorly of the "T" slot at an interior end of the second arm and wherein the rotating bushing is secured coaxially of the second arm.

6. A woodcutting guide as set forth in claim 5 wherein the forward wall of the guide further includes a polymeric friction laminate secured coextensively with the forward surface for adhering the tool relative to the guide.

7. A woodcutting guide as set forth in claim 6 wherein the first arm and the second arm are of a length of a range of two to four inches.

* * * * *